Nov. 10, 1953  N. A. NELSON  2,658,635
LOAD LIFTER ATTACHMENT FOR TRACTORS
Filed March 13, 1948  3 Sheets-Sheet 1

INVENTOR.
NORAL A. NELSON
BY
ATTORNEYS

Nov. 10, 1953  N. A. NELSON  2,658,635
LOAD LIFTER ATTACHMENT FOR TRACTORS
Filed March 13, 1948  3 Sheets-Sheet 2
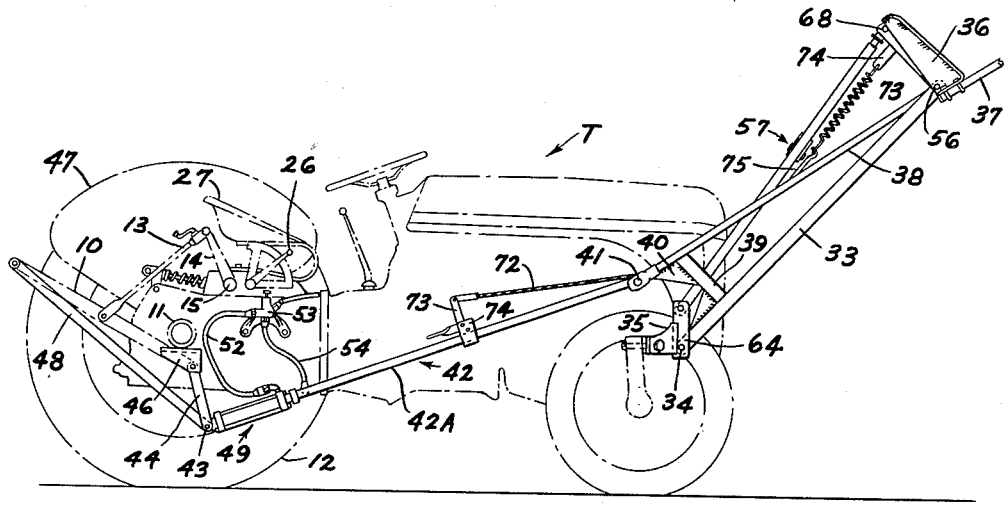
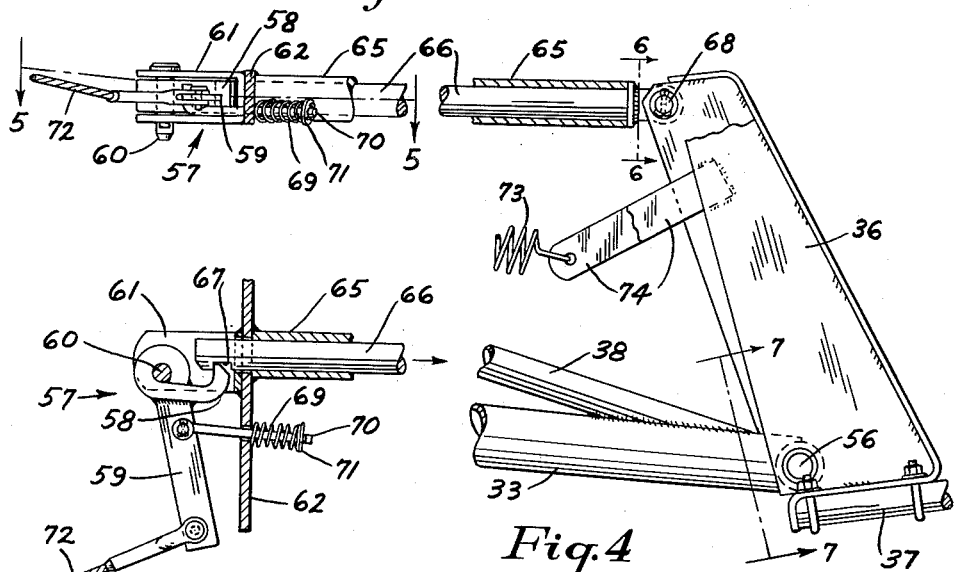
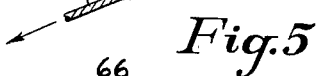
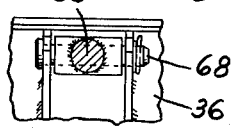
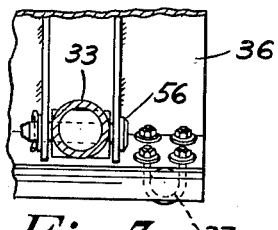
INVENTOR.
NORAL A. NELSON
BY
ATTORNEYS

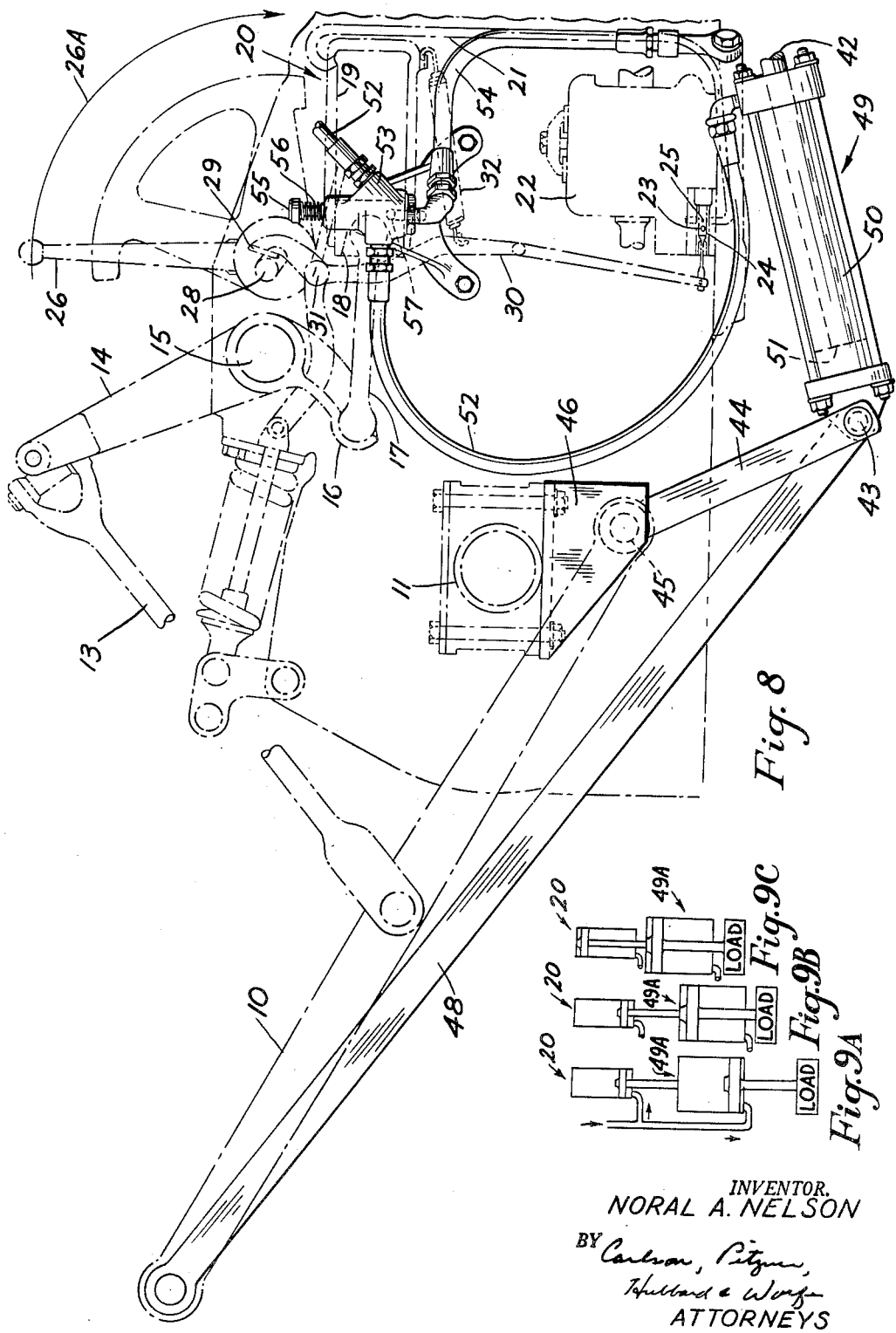

Patented Nov. 10, 1953

2,658,635

UNITED STATES PATENT OFFICE 2,658,635

LOAD LIFTER ATTACHMENT FOR TRACTORS

Noral A. Nelson, Royal Oak, Mich., assignor to Harry Ferguson, Inc., Detroit, Mich., a corporation of Delaware Application March 13, 1948, Serial No. 14,763

6 Claims. (Cl. 214—140)

1

The present invention pertains to load lifter attachments for tractors. More particularly, it has to do with such attachments for tractors having as standard equipment a draft linkage elevatable by a hydraulic power unit on the tractor and which is powered from the tractor engine.

One general object of the invention is to provide such an attachment equipped with an auxiliary hydraulic actuator mechanism adapted to be supplied with pressure fluid from the pump on the tractor and arranged to exert an especially strong initial lifting force on the load. Such strong initial effort is frequently required in breaking away a heavy load from the ground, as for example, when a manure pile to be lifted is frozen to the ground.

More particularly, it is an object to provide an attachment of the character indicated in which the initial load lifting accomplished by the auxiliary hydraulic actuator is followed by a further lift effected through elevation of the draft linkage by the main actuator on the tractor. Such sequential operation of auxiliary and main actuators, in that order, is especially desirable where there is provided on the tractor a cut-off control for the main actuator, operable automatically at the completion of draft linkage elevation.

Further, it is an object to provide a load lifter attachment of such character that an auxiliary hydraulic load lifting actuator included in the attachment is connected mechanically in series with a main hydraulic actuator in the tractor but connected hydraulically in parallel with such main actuator.

The invention also resides in various features of the preferred load lifting mechanism here shown by means of which dumping of the elevated load and automatic restoration of the device to carrying position are accomplished.

Further objects and advantages of the invention will become apparent as the following description proceeds taken in connection with the accompanying drawings in which:

Figs. 2 and 3 are side elevations of the installation shown in Fig. 1 and with the load lifter shown, respectively, in its lowered and fully raised positions.

Fig. 4 is an enlarged fragmentary side elevation of the fore portion of the attachment with the parts sectioned substantially along the line 4—4 in Fig. 1.

2

Figure 1:
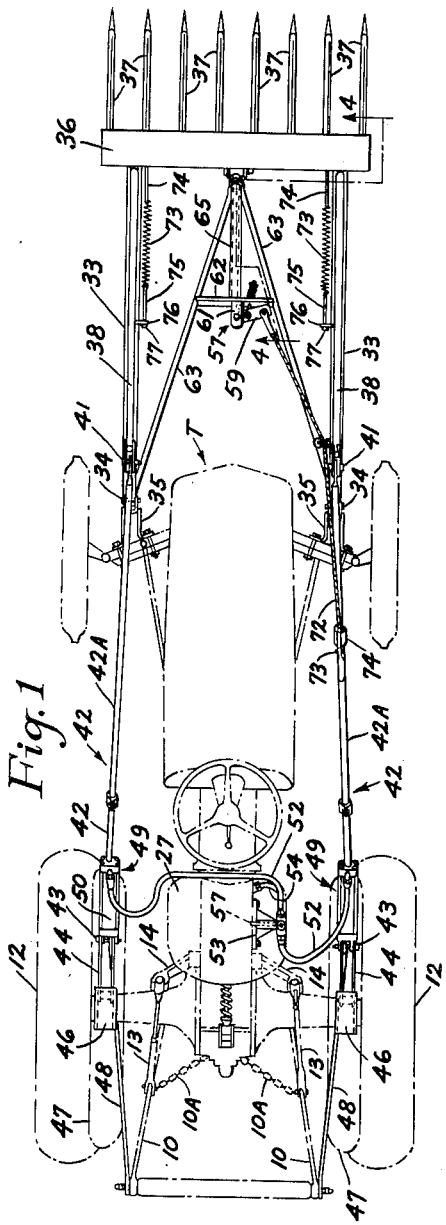
Figure 1 is a plan view of a load lifter attachment embodying the present invention and shown as applied to a tractor which appears simply in dot-dash outline.

Figs. 5, 6 and 7 are detailed sectional views taken respectively, substantially along the lines 5—5, 6—6 and 7—7 in Fig. 4.

Fig. 8 illustrates the auxiliary hydraulic system, and linkages used therewith, as applied to the basic tractor.

Figs. 9A, 9B and 9C illustrate the relationship of the auxiliary hydraulic system to the tractor's main hydraulic system.

Referring more particularly to the drawings, it is to be observed that although the particular load lifter attachment here shown is designed as a manure loader, the present invention is, as will be readily apprehended by those skilled in the art, applicable in its broader aspects to lifters designed for various other quite different specific employments. Similarly, even though the attachment has been shown here as applied to a tractor T which will be readily identifiable by those skilled in the art as a tractor of well known commercial form equipped with the power operated draft linkage of Henry George Ferguson, Patent No. 2,118,180, issued May 24, 1938, nevertheless this particular tractor is simply illustrative of the general class of tractor with which lifter attachments embodying the present invention are useful. Consequently, even though one specific installation has been shown and described with some detail, there is no intention to thereby limit the invention to the specific details of construction here shown. On the contrary, the intention is to cover all modifications and alternative constructions and employments falling within the spirit and scope of the invention as expressed in the appended claims.

Tractor

Before proceeding to a description of the construction and operation of the load lifter attachment itself, it will be useful, as a preliminary, to identify briefly the structure of the tractor T here shown (Figs. 1 and 2) and particularly those elements with which the attachment is most directly associated. At the rear end of this tractor is a draft linkage comprising a trailing pair of draft links 10 pivoted at their forward ends on the rear portion of the tractor to swing generally vertically. The pivotal axis for these links is located below and slightly forward of an axle 11 for the tractor's pneumatically tired rear drive wheels 12.

Drop links 13 connect respective ones of the draft links 10 to a pair of crank arms 14 rigid with a transverse rock shaft 15. Also rigid with this shaft 15 is a depending arm 16 (Fig. 8), having a socketed lower end receiving the rear end of a thrust member 17. The forward end of such thrust member is socketed in a piston 18 slidably received within a cylinder 19 of the main hydraulic actuator or ram 20 on the tractor. Supply of pressure fluid, such as oil, to the cylinder 19 acts on the operative face area of the piston 18 and thrusts the piston 18 outward, raising the draft linkage 10. On the other hand, exhaust of pressure fluid from the cylinder 19 permits the draft linkage to lower under the force of gravity with a retreat of the piston 18 back into the cylinder.

Pressure fluid is supplied to the cylinder 19 through a conduit 21 by a pump 22 powered from the tractor engine (not shown). Fluid is also exhausted from the cylinder 19 through this same line 21 to a sump surrounding the pump. Supply and exhaust of pressure fluid through the conduit 21 are controlled by a suitable valve mechanism comprising, in this instance, a slidable valve plunger 23.

When the plunger 23 is in its mid or neutral position shown (Fig. 8) it blocks both pump intake ports 24 and restricted bleed ports 25. Shift of the plunger 23 to the left retains the supply ports 24 covered but opens the bleed ports 25, permitting pressure fluid to exhaust from the cylinder 19. Conversely, shift of the plunger 23 to the right from its mid position retains the bleed ports 25 blocked but opens the intake ports 24 so that fluid may pass to the pump and thence to the cylinder.

Figure 2:
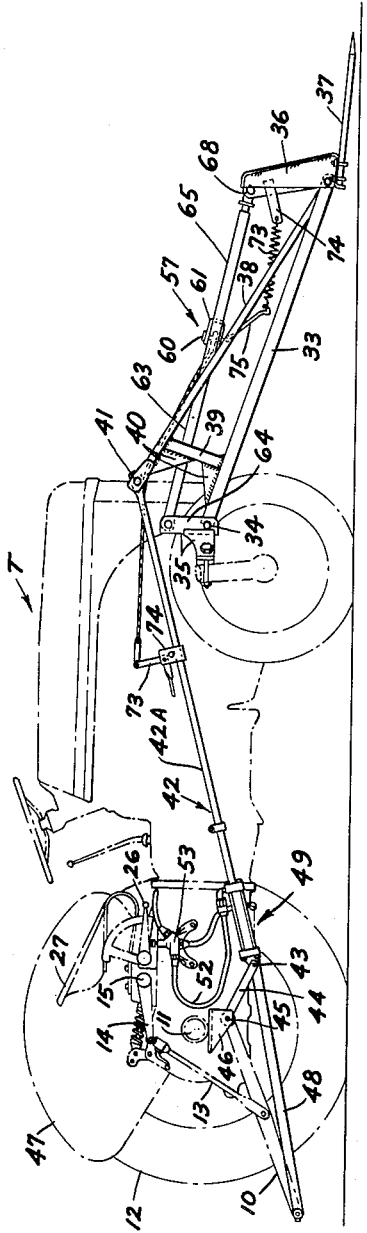

A quadrant lever 26, mounted conveniently alongside the driver's seat 27, is used in shifting the valve plunger 23 manually (Fig. 2). In Fig. 8, the parts are shown in the positions which they occupy when the draft linkage 10 is fully elevated. The valve plunger 23 is, in such case, in neutral. To lower the draft linkage, the quadrant lever 26 is swung forward in the direction of the arrow 26a so that an eccentric 28 presses against a pad 29 on the upper end of a floating lever 30, thereby rocking such lever clockwise about its intermediate pivot point 31. The valve plunger 23 is thus shifted to the left for exhaust of fluid and lowering of the linkage. Check chains 10a (Fig. 1) may be connected between the draft links and rear end of the tractor for limiting the extent of lateral movement for the draft linkage.

To raise the draft linkage, the quadrant lever 26 is pulled upward again, thus tending to withdraw the eccentric 28 from the pad 29. Thereupon, a contractile spring 32 swings the floating lever 30 counterclockwise, pushing the valve plunger 23 to the right and uncovering supply ports 24 for supply of fluid to the cylinder 19. At the completion of the raising movement of the draft linkage 10, the skirt of the piston 18 emerges from the cylinder 19 and strikes the floating lever 30, rocking it clockwise. The valve plunger 23 is thus restored to its mid or neutral position, effecting an automatic cutoff upon completion of raising of the draft linkage. We need not be concerned here with the provision normally made in such tractors for shifting of the floating lever 30 to effect automatic draft control since such mechanism is not used with the presently contemplated load lifter attachment.

*General construction of attachment*

Having in mind the over-all setup of the hydraulically operated draft linkage on the tractor T, described above, attention may now be given to the exemplary form of load lifter attachment here shown for use with it. In general, such attachment is arranged in a manner to utilize raising of the draft linkage 10 for lifting the load. Provision is made, however, for utilizing an auxiliary hydraulic actuator mechanism incorporated in the attachment, for imparting an initial raising movement to the load before any raising of the draft linkage takes place. The use of such auxiliary actuator mechanism makes it possible to afford a substantially greater piston area than is available in the main actuator 20 so that a very heavy load can be broken free for raising but without exceeding safe values of fluid pressure in the hydraulic system. The sequence of operation noted serves, moreover, to bring about an automatic cut-off at the completion of a load raising cycle, since elevation of the draft linkage with its automatic cut-off at the upper limit takes place as the final step in the contemplated cycle.

The particular load lifter attachment here shown (see Figs. 1 and 2) includes a lifting device comprising a pair of booms 33 projecting forward side by side and pivoted at their rear ends at 34 to brackets 35 detachably fixed to the front axle of the tractor. Rockably mounted on the forward ends of these booms 33 is a generally upright shield 36 having a set of tines 37 fixed along its lower edge to project forward and coact with the shield in constituting a suitable lifting fork.

Rigid with the booms 33 are upwardly and rearwardly extending bars 38 (Figs. 2 and 4). The forward ends of these bars 38 are welded or otherwise rigidly secured to the forward ends of the booms while their rear portions are joined to the booms by uprights 39, having suitable triangular reenforcing plates 40.

The elevated rear ends of the bars 38 afford pivotal attaching points 41 for rearwardly extending tension connectors designated generally as 42. Since the connecting points 41 are located above the pivotal axis 34 for the booms 33 a rearward pull on the connectors 42 will serve to swing the booms 33 upward about their pivots 34.

At their trailing ends, the connectors 42 are pivotally connected at 43 (Fig. 2) to the lower ends of operating links or members 44 pivoted at 45 on brackets 46. Such brackets may be conveniently secured to the tractor's rear axle by the same bolts which fasten the rear mudguards 47 in place. The brackets 46 are so arranged that the pivots 45 are in substantial alinement with the pivotal axis of swing for the draft links 10. Moreover, the outer ends of the draft links are joined by links 48 with the lower ends of the operating arms 44 so that each of the sets of parts 10, 48, 44, constitutes a rigid triangle, swingable about a transverse horizontal axis at 45. The operating arms 44 thus swing in unison with the draft links 10, but in a generally rearward and downward direction as the draft links are raised.

*Auxiliary hydraulic system*

With the setup as so far detailed, raising of the draft linkage 10 would draw tension connectors 42 rearward, swinging the lifter booms 33 upward. With simply a rigid connection between the points 41 and 43, however, the main hydraulic actuator 20 would be required to supply all of the force necessitated for initiating lifting of the load. To afford a greater initial lifting force, and without increasing the pressure in the hydraulic system, axially contractible auxiliary hydraulic actuators 49 have been interposed or included in the tension connectors 42. Each of these actuators comprises a cylinder 50 in which is slidably received a piston 51 (Fig. 8). Each cylinder 50 constitutes one end portion of one of the tension connectors 42, and a long slender rod 42a attached to the associated piston 51 constitutes, with the piston, the remainder of such connector.

Pressure fluid is supplied to forward ends of respective ones of the cylinders 50 through flexible conduits 52. These conduits are, in turn, connected through a valve 53 to a conduit 54, communicating with the conduit 21 in the main hydraulic system. The valve 53 is equipped with a plunger 55 normally biased by spring 56 into an upper position shown and in which communication is established between the conduit 54 and the branch conduits 52. Upon being thrust downward, the plunger 55 blocks the outlet of the conduit 54 and opens the branch conduits 52 to an exhaust line 57 leading back to the sump. The auxiliary cylinders are thus exhausted directly to the sump rather than through the restricted bleed ports 25 of the main valve. Accordingly, a fast "drop" for the system is accomplished.

The head of the plunger 55 is located in alinement with the quadrant lever 26 so that when the latter is swung down to its lowering position shown in Fig. 2, the plunger will be depressed, permitting exhaust of fluid from the auxiliary cylinders 50. With the lifter attachment in its lowered position shown in Fig. 2, raising of the quadrant lever 26 releases the plunger 55 and also serves, as previously described, to shift the main valve plunger 23 to its fluid supply position. Consequently, all three cylinders, 20, 50 and 50, are connected simultaneously and in parallel to the output of the pump 22.

Pausing for a moment to analyze the over-all pattern of the setup, it will be observed that the auxiliary actuators 49 are mechanically connected to the load in series with the main actuator 20, but are hydraulically connected in parallel with the main actuator. The results of that peculiar relationship can perhaps best be appreciated by reference to the diagrammatic showings in Figs. 9A, 9B and 9C. There a single, large auxiliary actuator 49a having a large operative piston area subject to fluid pressure has been shown, for sake of simplicity, instead of the two auxiliary actuators 49 previously mentioned. Of course, any number desired can actually be used. As shown in Fig. 9A, the main actuator 20 and auxiliary actuator 49a are mechanically connected in series to the "load." They are, however, hydraulically connected in parallel to a common source of pressure fluid.

Upon supply of fluid, that one of the two pistons will move first which is most lightly loaded per unit of operative area. Since the piston of actuator 49a is larger than that of main actuator 20, its piston will first raise the "load" (Fig. 9B). Then continued supply of pressure fluid causes the piston of the main actuator 20 to rise, moving the auxiliary actuator 49a bodily and raising the "load" a second increment of distance (Fig. 9C).

That is basically the action which takes place in the actual mechanism illustrated (Figs. 1 to 8). As compared to the simple layout of Figs. 9A to 9C, certain important factors come into play, however, especially in reference to the mechanical connections between auxiliary and main actuators.

Of such connections it is to be observed first of all that the line of action of the pull from the auxiliary actuators must be so located that there actually is a series mechanical connection to the main actuator. In the illustrated construction (see Fig. 2) the line of action of the tension connectors 42 passes beneath the pivotal axis of the draft links 10. Accordingly, contraction of these connectors 42, upon operation of the auxiliary actuators, exerts a downward tug on the draft links. This, in turn, is imposed as a load on the main actuator via the connections 13, 14, 15, 16, and 17. By way of contrast, if the line of action for the connectors 42 passed above, instead of below, the pivotal axis for the draft links 10, their contraction of the connectors 42 would tend to raise the links 10. No load would be imposed on the main actuator 20; in fact, the links 10 would rise freely. Indeed, there would be no "series" mechanical connection between the auxiliary and main actuators to sustain the load. It will thus be clear that for the series mechanical connection contemplated the load must be applied to the main actuator through the auxiliary actuator or actuators.

Secondly, the mechanical connections from the auxiliary actuators back to the main actuator may be, and in the illustrated construction are, of such character as to introduce leverage type force multiplication into the set up. That factor must therefore be taken into account in working out the piston dimensions, particularly as to operative areas subjected to fluid pressure, to be sure that the unit area loading on the auxiliary piston or pistons is less than that on the main actuator piston when raising is initiated. In designing a particular setup it will thus be necessary to work out a force diagram for the mechanical linkage and determine the net effect of the leverage system employed to ascertain its multiplying or dividing effect on forces transmitted from one actuator to the other, in arriving at piston sizes. In the exemplary installation shown, the two auxiliary pistons 51 are each of approximately the same diameter as the main actuator piston 18 so as to give an ample margin of excess in auxiliary piston area over main piston area.

By virtue of connecting the actuators as described (i. e., mechanically in series and hydraulically in parallel), a number of advantages are accomplished. One, the high initial raising force on the load made available with a lesser fluid pressure than would be possible in using the main actuator above, has already been mentioned. A second is that the hydraulic system is automatically cut off on completion of load elevation since things have been arranged so that completion of main actuator travel (with accompanying cutoff) is the last or final step in the load raising cycle. A third is that the final portion of the load raising operation takes place at a faster rate than the initial portion.

The change in load raising rate just noted comes about because of the disparity in piston areas in the main and auxiliary actuators. Assuming the pump 22 to be delivering fluid at a constant volumetric rate, the auxiliary pistons 51 will be displaced at a rate substantially less than the rate of subsequent displacement of the main piston 18 since the latter is substantially smaller in area than the sum of the two auxiliary pistons. Being smaller in area, it is displaced a proportionately greater distance by entry of given volume of fluid, in unit time, into the cylinder behind it.

To conserve over-all time of operation it is desirable that speed of load raising increase once the load has been broken away from its point of rest and started upward. Moreover, with the illustrated arrangement, less lifting force is required during the final rise of the fork 36, 37 because of the progressively increasing mechanical advantage which the booms 33 enjoy once they have swung upward beyond fully horizontal position in approaching the fully raised position of Fig. 3.

Fork trip mechanism

Provision is desirably made for tripping the fork 36, 37 to dump its load from an elevated position. For such purpose the shield 36 is pivoted at 56 (see Fig. 4) on the front ends of the booms 33 to rock in a fore and aft direction. The fork 36, 37 is normally restrained against swinging forwardly about its pivots 56 into a dumping position by a latch mechanism designated generally as 57 (see Figs. 1, 4 and 5).

The latch mechanism 57 includes a latch member or dog 58 rigid with a lever 59 pivoted on a pin 60. The latter pin is removably inserted between the jaws of a U-shaped bracket 61 fixed to a transverse bar 62 extending between a pair of diagonal struts 63. Such struts are pivotally connected at their rear ends to upstanding bars 64 on the brackets 35 (Fig. 2) and converge forwardly (Fig. 1) with their front ends fixed to a sleeve 65. At its rear end this sleeve 65 is rigidly connected to the transverse bar 62 (Figs. 4 and 5).

Slidably received within the sleeve 65 is a bar or plunger 66 having a notch 67 in its rear end portion (Fig. 5) receiving the nose of the latch dog 58. At its forward end the plunger 66 is pivotally connected by a pin 69 with the upper central portion of the shield 36 (Figs. 4 and 6). A compression spring 69 serves to yieldably retain the latch mechanism 57 in latched position. This spring encircles a pin 70 pivotally connected to the lever 59 and is interposed between the forward face of the transverse bar 62 and a stop collar 71 on the pin 70.

The operator trips the fork 36, 37 to dump the load by releasing the latch mechanism 57. For that purpose a trip rope 72 (Fig. 5) is connected to the lever 59 and extends rearwardly to a bell crank operating handle 73 (Fig. 2) pivoted on a bracket 74 fixed to one of the tension connector rods 42a. When the operator rocks this lever 73 rearward, the latch dog 58 is withdrawn from the notch 67 so that the plunger 66 can slide forward. Thereupon, the fork 36, 37 rocks forward under the weight of the load which it is carrying and the load slides off.

As soon as the load slides off of the fork 36, 37 the fork is automatically restored to latched position. For that purpose a pair of restoring springs 73 are provided (Fig. 1). The forward ends of these springs are connected by respective bracket arms 74 to the side flanges on the shield 36 (Fig. 4). The rear ends of such springs 73 are, on the other hand, connected by hooks 75 with bracket ears 76 (Fig. 1) on the bars 38. The hooks 75 are slidably received in apertures in these brackets and adjustment of spring tension is accomplished by threading retaining nuts 77 along the threaded shanks of the hooks.

Resumé of operation

It will be assumed that the load lifting attachment described is installed on the tractor in the manner illustrated. In approaching a pile of manure the tractor is driven forward with the loader in the lowered position shown in Fig. 2. Forward motion of the tractor shoves the tines 37 into the pile. To raise the load the operator swings the quadrant lever 26 upward from the position indicated in Fig. 2 to that shown in Fig. 3. Thereupon delivery of pressure fluid by the pump 22 is instituted. Moreover, raising of the quadrant lever releases the plunger 55 so that the auxiliary actuators are disconnected from the drain.

Pressure fluid passes from the pump to the auxiliary actuators 49 causing them to contract and thus rock the lifter booms 33 upward. A powerful lifting force is thus applied to the fork and the load is slowly raised.

When the auxiliary actuators 49 have completed their stroke the continued delivery of pressure fluid from the pump supplies the main actuator 20. It raises the draft links 10 thereby continuing the upward swing of the booms 33. This second part of the lifting cycle takes place at a more rapid rate, however, in view of the smaller piston area of the main actuator as compared to the total piston area of the auxiliary actuators.

At the completion of the lifting motion for the draft links 10 there is an automatic cutoff of fluid supply effected by the completion of the main actuator's stroke in the manner heretofore detailed. The hydraulic system is thus stopped automatically with the fork 36, 37 in its fully elevated position shown in Fig. 3.

The tractor T can then be driven to any point where it is desired to deliver the load. To dump the load the operator then has only to reach out and rock the hand lever 73 rearward thereby releasing the latch 57. The weight of the load rocks the unlatched fork forward so that the load can slide off by gravity. As soon as the fork is free to the load it is snapped back to position by the restoring springs 73.

To lower the fork 36, 37 again into the starting position shown in Fig. 2, the operator has only to depress the quadrant lever 36. That opens the valve ports 25 for lowering of the draft links 10 and at the same time depresses the auxiliary valve plunger 55 for exhaust of fluid from the auxiliary actuators 49.

I claim as my invention:

1. In a front-end loader for a tractor having a pivotally mounted, vertically swingable draft linkage trailed from its rear portion and elevatable by a main hydraulic actuator on the tractor supplied with pressure fluid from an engine-driven pump, the combination of a load elevating device having means for detachably supporting the same on the fore portion of the tractor for generally vertical swinging motion, a tension connector pivotally connected to said elevating device at a point above the latter's axis of swing and extending generally rearward and downward therefrom, said tension connector having an axially contractible auxiliary hydraulic actuator interposed therein and operable upon supply of pressure fluid to shorten the overall length of said connector, a rigid link adapted at one end portion for pivotal connection to the tractor in substantial alinement with the axis of vertical swing of said linkage and in depending relation thereto, a tension member adapted at its rearward end portion for pivotal connection to the trailing end of said linkage, means for pivotally interconnecting the depending end portion of said rigid link, the forward end portion of said tension member and the rear end of said tension connector for applying an upward swinging force to the load elevating device upon upward swing of the draft linkage, and conduit means for supplying pressure fluid from the pump on the tractor to said auxiliary actuator.

2. In a front-end loader for a tractor having pivotally mounted, vertically swingable draft links trailed from its rear portion and elevatable by a main hydraulic actuator on the tractor supplied with pressure fluid from an engine-driven pump, the combination of a load elevating boom pivotally connected to a supporting bracket, means for detachably fixing said bracket on the fore portion of the tractor with said boom projecting forwardly of the tractor for generally vertical swinging motion about its pivot, a tension connector pivotally connected to said boom at a point above the latter's axis of swing and extending generally rearward and downward therefrom, said tension connector having an axially contractible auxiliary hydraulic actuator interposed therein and operable upon supply of pressure fluid to shorten the over-all length of said connector, means for pivotally attaching the rear end of said connector to one of said draft links at a point of pivotal connection located below the pivotal axis of vertical swing for said link including a pair of rigid members connected together and to opposite ends of said one draft link to define a rigid triangle, said pair of members at their point of connection having a pivotal connection with said tension connector, and conduit means for supplying pressure fluid from the pump on the tractor to said auxiliary actuator.

3. In a load lifting attachment for a tractor having a draft linkage trailing from its rear end and swingable vertically by a piston and cylinder type main hydraulic actuator on the tractor supplied with pressure fluid from an engine-driven pump, the combination of a load carrier mounted on the tractor a mechanical connector mechanism extending from said carrier and attachable to the draft linkage for applying a load thereto in a direction of application imposing a downward component of force on the linkage, an axially contractible auxiliary hydraulic actuator mechanism interposed in said connector mechanism and operable upon supply of pressure fluid thereto to contract and thereby move the load carrier relative to the tractor while applying downward force on said linkage, conduit means for supplying pressure fluid from said pump to said auxiliary actuator mechanism in parallel with the main hydraulic actuator, and said auxiliary actuator mechanism having a total piston area substantially in excess of that of the main actuator to insure a lower unit area loading on said auxiliary actuator mechanism with resultant low speed initial movement of the load carrier by the auxiliary mechanism followed by a fastener movement of the same effected by a subsequent elevation of the draft linkage by the main actuator.

4. In a load lifting mechanism for application to a tractor having a draft linkage trailingly pivoted on its rear end portion for vertical swing by a main piston and cylinder type hydraulic actuator on the tractor supplied with pressure fluid from an engine-driven pump, the combination of a load lifting device having means for pivotally supporting the same on the fore portion of the tractor for raising motion, a tension connection mechanism adapted to extend between said lifting device and said draft linkage with the line of action of said mechanism passing beneath the pivotal axis of such linkage, auxiliary piston and cylinder type hydraulic actuator mechanism interposed in said tension connection mechanism for contraction of the same upon application of pressure fluid to such auxiliary mechanism, a flexible supply line for conveying fluid to said auxiliary actuator mechanism from said pump in parallel with the supply of such fluid to the main actuator, and the ratio of piston areas in said main and auxiliary actuator mechanisms, taken with the relative moment arms of their respective mechanical connections to said draft linkage, being such as to effect a lighter loading per unit of piston area in the auxiliary than in the main actuator upon initial application of fluid pressure.

5. In a load lifting attachment for a tractor having a draft linkage trailing from its rear end and swingable vertically by a piston and cylinder type main hydraulic actuator on the tractor supplied with pressure fluid from an engine-driven pump, said tractor also having a manual control lever for such actuator movable between raising and lowering positions: the combination of a mechanical connector mechanism attachable to the draft linkage for applying a load thereto in a direction of application imposing a downward component of force on the linkage, an axially contractible auxiliary hydraulic actuator mechanism interposed in said connector mechanism and operable upon supply of pressure fluid thereto to contract and thereby raise the load while applying downward force on the linkage, conduit means for supplying pressure fluid to said auxiliary actuator mechanism in parallel with the main hydraulic actuator, an exhaust conduit, a cut-off valve normally spring biased to closed position and interposed between said exhaust conduit and said auxiliary actuator mechanism, an operating plunger for said cut-off valve, and means for supporting said cut-off valve and its plunger in position to effect actuation of said plunger, with resultant opening of such valve, by the manual control lever's movement into lowering position.

6. In a load lifting attachment for a tractor having a draft linkage swingable about a horizontal axis by a main pressure fluid operated actuator mechanism having an operative area subjected to pressure fluid from a pump driven from the tractor engine, the combination of a load lifting device having means for pivotally supporting it on the tractor to swing about an axis substantially parallel to the axis of the linkage, tension connection mechanism connectible to said lifting device and to the linkage so that the line of action of said mechanism passes above the pivotal axis of the device and below the pivotal axis of the linkage and is effective to impart a lifting force to the device when the linkage is swung upwardly, an auxiliary pressure fluid operated actuator mechanism operative when supplied with fluid to reduce the effective length of said tension connection mechanism and thereby impart a lifting force to said device, and conduit means for supplying pressure fluid to said auxiliary actuator mechanism in parallel with the supply of fluid to the main actuator mechanism, said auxiliary actuator mechanism having an operative area subjected to the fluid pressure and being proportioned to the operative area of said main actuator mechanism so that the load per unit area of said auxiliary actuator mechanism imposed thereon by said tension connection mechanism is lighter than the load per unit area of the main actuator mechanism imposed on the latter by the linkage so as to cause said auxiliary actuator to operate first and impart an initial lifting force to said device.

NORAL A. NELSON.

References Cited in the file of this patent

UNITED STATES PATENTS

| Number | Name | Date |
|---|---|---|
| 1,808,139 | Hozack | June 2, 1931 |
| 2,148,359 | Le Bleu | Feb. 21, 1939 |
| 2,348,899 | Guignard et al. | May 16, 1944 |
| 2,385,987 | Henry | Oct. 2, 1945 |
| 2,398,119 | Sauder | Apr. 9, 1946 |
| 2,402,299 | Schield | June 18, 1946 |
| 2,412,570 | Ender | Dec. 17, 1946 |
| 2,432,645 | Ausfahl et al. | Dec. 16, 1947 |
| 2,440,765 | Acton | May 4, 1948 |
| 2,446,827 | Hall | Aug. 10, 1948 |
| 2,449,212 | Fraga | Sept. 14, 1948 |
| 2,453,649 | Warren | Nov. 9, 1948 |
| 2,458,195 | Pearse | Jan. 4, 1949 |
| 2,474,998 | Acton | July 5, 1949 |
| 2,543,496 | Holopainen | Feb. 27, 1951 |